(12) United States Patent
Hurst

(10) Patent No.: US 10,898,998 B2
(45) Date of Patent: Jan. 26, 2021

(54) MAGNETIC MOUNT FOR POWER TOOL

(71) Applicant: Unique Construction Products Inc., Edmonton (CA)

(72) Inventor: Kristopher James Hurst, Kelowna (CA)

(73) Assignee: Unique Construction Products Inc., Edmonton (CA)

(*) Notice: Subject to any disclaimer, the term of this patent is extended or adjusted under 35 U.S.C. 154(b) by 0 days.

(21) Appl. No.: 16/554,615

(22) Filed: Aug. 28, 2019

(65) Prior Publication Data
US 2020/0055175 A1   Feb. 20, 2020

Related U.S. Application Data

(63) Continuation of application No. 14/630,414, filed on Feb. 24, 2015.

(60) Provisional application No. 61/966,364, filed on Feb. 24, 2014.

(51) Int. Cl.
*B25F 5/02* (2006.01)
*F16M 13/02* (2006.01)
*B25H 3/00* (2006.01)

(52) U.S. Cl.
CPC .............. *B25F 5/026* (2013.01); *B25H 3/006* (2013.01); *F16M 13/022* (2013.01)

(58) Field of Classification Search
CPC . B25F 5/02; B25F 5/026; B25F 5/024; B25H 3/006; Y10S 211/01; F16M 13/022; F16M 11/041; E06C 7/14

USPC ........ 248/206.5, 674, 210, 683, 311.2, 346.1, 248/346.5, 146, 117.2; 294/142; 408/76; 81/489; 16/406, 426, 422; 219/242
See application file for complete search history.

(56) References Cited

U.S. PATENT DOCUMENTS

| | | | | |
|---|---|---|---|---|
| 1,561,554 A | * | 11/1925 | Little ................. | F21V 21/0965 362/398 |
| 2,160,405 A | | 5/1939 | Mallalieu | |
| 2,506,400 A | * | 5/1950 | Wietz ................. | F21V 21/0965 248/206.5 |
| 2,662,988 A | * | 12/1953 | McKim .................... | H02K 5/00 310/91 |
| 2,841,192 A | * | 7/1958 | Martin ..................... | B27B 9/00 30/377 |
| 2,977,082 A | | 3/1961 | Harris | |
| 4,276,675 A | * | 7/1981 | Pioch .................... | B23B 45/001 16/426 |
| 4,358,661 A | * | 11/1982 | Kaderabek ............... | B23K 3/03 219/230 |

(Continued)

*Primary Examiner* — Ingrid M Weinhold
(74) *Attorney, Agent, or Firm* — Robert A Nissen

(57) ABSTRACT

A magnetic mount for a power tool to secure the power tool to a ferrous surface includes a substantially u-shaped bracket including a spaced apart pair of mounting arms each having a base end and an opposite distal end, a rigid cross-member joining the pair of mounting arms at the base ends, a mounting head on each distal end of the pair of mounting arms, at least one magnet mounted on the cross-member, wherein the pair of mounting arms are disposed in a first direction from the cross member and the magnet is disposed in a second direction substantially opposite to the first direction, from the cross-member, and wherein the mounting heads are adapted for mounting to at least one side of the power tool.

9 Claims, 7 Drawing Sheets

(56) References Cited

U.S. PATENT DOCUMENTS

| | | | | |
|---|---|---|---|---|
| 4,506,317 A * | 3/1985 | Duddy | ............... | F21V 21/0965 |
| | | | | 362/191 |
| 4,639,170 A | 1/1987 | Palm | | |
| 4,727,462 A * | 2/1988 | Komonko | ........... | F21V 21/0965 |
| | | | | 248/206.5 |
| 4,832,299 A | 5/1989 | Gorton | | |
| 4,907,769 A * | 3/1990 | Hunley, Jr. | ............. | F21V 21/06 |
| | | | | 248/122.1 |
| 4,964,606 A | 10/1990 | Beam | | |
| 4,985,817 A * | 1/1991 | Yale | ........................ | F21L 14/02 |
| | | | | 248/206.5 |
| 5,078,281 A | 1/1992 | Johnson | | |
| 5,140,508 A * | 8/1992 | Komonko | ............... | F21V 21/08 |
| | | | | 248/316.5 |
| 5,231,727 A * | 8/1993 | Armbruster | ............ | B24B 23/00 |
| | | | | 15/144.1 |
| 5,405,004 A * | 4/1995 | Vest | ........................ | B25H 3/06 |
| | | | | 206/350 |
| 5,577,697 A * | 11/1996 | Accordino | ......... | F21V 21/0965 |
| | | | | 248/206.5 |
| 5,695,165 A | 12/1997 | Moriarty | | |
| 5,725,422 A * | 3/1998 | Leweck | ............... | B24B 23/005 |
| | | | | 16/426 |
| 6,113,047 A | 9/2000 | Wung | | |
| 6,241,594 B1 * | 6/2001 | Lepold | .................. | B24B 23/005 |
| | | | | 451/357 |
| 6,279,741 B1 * | 8/2001 | Arvin | ..................... | B25H 3/006 |
| | | | | 206/349 |
| 6,496,094 B2 * | 12/2002 | May, III | ............... | B25B 11/002 |
| | | | | 211/69 |
| 6,499,172 B1 * | 12/2002 | McCracken | ......... | B24B 23/005 |
| | | | | 15/144.1 |
| 6,499,219 B1 * | 12/2002 | Wightman | ............. | B25F 5/024 |
| | | | | 33/334 |
| D492,178 S * | 6/2004 | Wright | ............................. | D8/70 |
| 6,810,547 B2 * | 11/2004 | Hung | ................. | A47L 11/4075 |
| | | | | 15/144.1 |
| 7,000,732 B1 * | 2/2006 | Briggs, Jr. | .............. | B25H 3/00 |
| | | | | 182/129 |
| 7,024,792 B2 * | 4/2006 | Graham | ............... | G01B 3/1071 |
| | | | | 33/759 |
| 7,114,592 B1 * | 10/2006 | Gibson | .................... | E06C 1/39 |
| | | | | 182/129 |
| 7,344,118 B2 * | 3/2008 | Samberg | ............... | B25H 3/006 |
| | | | | 206/349 |
| D566,061 S * | 4/2008 | Johnson | ...................... | D13/183 |
| 7,770,858 B2 | 8/2010 | Fehrenbach | | |
| 8,033,342 B2 * | 10/2011 | Clark | ........................ | B25C 7/00 |
| | | | | 173/1 |
| 8,142,045 B2 | 3/2012 | Peak | | |
| 8,148,000 B2 * | 4/2012 | Furuta | ................. | H01M 2/1022 |
| | | | | 206/703 |
| 8,210,276 B2 * | 7/2012 | Krondorfer | .......... | B23D 47/005 |
| | | | | 16/426 |
| 8,312,598 B2 * | 11/2012 | Palmer | ..................... | B62B 1/12 |
| | | | | 16/422 |
| 8,371,708 B2 * | 2/2013 | Nagasaka | ............... | B25B 23/18 |
| | | | | 173/162.2 |
| 8,690,497 B2 * | 4/2014 | Bodine | ................... | B25F 5/026 |
| | | | | 408/124 |
| 9,157,573 B1 * | 10/2015 | Zach | ....................... | B60N 3/102 |
| 9,227,285 B1 * | 1/2016 | Briggs | ..................... | B23Q 9/00 |
| 9,347,264 B2 * | 5/2016 | Mosier | ..................... | E06C 7/188 |
| 9,481,077 B2 * | 11/2016 | Bodola | ..................... | B25B 27/14 |
| 2005/0217440 A1 * | 10/2005 | Koschel | ................. | B25F 5/026 |
| | | | | 81/490 |
| 2006/0006024 A1 * | 1/2006 | Till | ........................... | E06C 1/39 |
| | | | | 182/129 |
| 2008/0035590 A1 * | 2/2008 | Huang | ................... | B25H 3/006 |
| | | | | 211/70.6 |
| 2008/0223593 A1 * | 9/2008 | Eicher | ................... | B25D 17/043 |
| | | | | 173/162.2 |
| 2009/0038121 A1 * | 2/2009 | Eicher | ..................... | B24B 23/005 |
| | | | | 16/426 |
| 2009/0178520 A1 * | 7/2009 | Engelfried | ............. | B25D 17/04 |
| | | | | 81/489 |
| 2011/0192810 A1 | 8/2011 | Kao | | |
| 2013/0055860 A1 * | 3/2013 | French | .................... | B25F 5/026 |
| | | | | 81/489 |
| 2013/0062498 A1 * | 3/2013 | Ito | ........................... | B25B 21/00 |
| | | | | 248/672 |
| 2013/0112502 A1 * | 5/2013 | Oliver | ....................... | E06C 7/14 |
| | | | | 182/129 |
| 2014/0251649 A1 * | 9/2014 | Kondo | .................... | B23Q 9/00 |
| | | | | 173/170 |
| 2014/0251650 A1 * | 9/2014 | Kondo | ..................... | B25F 5/02 |
| | | | | 173/171 |
| 2015/0266105 A1 * | 9/2015 | Scheid | .................... | B23B 45/02 |
| | | | | 408/1 R |
| 2017/0326723 A1 * | 11/2017 | Chao | ....................... | B25H 3/006 |

\* cited by examiner

MAGNETIC MOUNT FOR POWER TOOL

FIELD OF THE INVENTION

This invention relates to a magnetic mount for power tools such as a hand grinder to secure the power tool to a ferrous surface while the tool is not in use to temporarily store the tool thereby freeing workspace and inhibiting the tool from falling from such as structural steel construction projects.

BACKGROUND OF THE INVENTION

It is known that magnets can be used to hold tools and work pieces, and applicant is aware of patents regarding such. See for example in the prior art:

U.S. Pat. No. 2,977,082 title "Magnetic Support" issued to Harris as of Aug. 1, 1960 describes "a ring magnet with a non-metallic insert that is apertured, and to entirely enclose the magnet and insert in a relatively thin layer of rubber-like material, thereby forming a homogenous covering that not only holds the insert in position but materially increases the frictional grip of the magnet on the metallic supporting surface, yet not materially reducing the holding power of the magnet." See also U.S. patent application Ser. No. 12/701,776, published on Aug. 11, 2011 under publication number US2011-0192810, which describes a rack for storing hand tools on the side of a metal tool cabinet and which describes a variety of applications of the magnetic support.

U.S. Pat. No. 4,639,170 titled "Magnetic base for portable tools" issued to Palm as of Apr. 8, 1985 describes a power tool with a magnetic base with superposed magnets. Palm states that the upper assembly can be moved relative to the lower assembly to subtract from or reinforce the magnetic field. The upper assembly is somewhat shorter than the lower assembly so even when the upper assembly is positioned to shunt to subtract from the flux of the lower assembly there will be some magnetic flux attracting the base to a ferromagnetic material. When the sensing probe is pushed into the base the electric motor can be switched on to rotate a spindle on which a rotary cutting tool is axially mounted. The tool feed is controlled by a handle which can be mounted on either side of the tool housing.

U.S. Pat. No. 2,160,405 titled "Magnetic Work Holder", issued to Frank effective on Apr. 8, 1938 describes a magnetically energized work holder for articles of magnetic material and in which the magnetic holding members are energized by permanent magnets.

SUMMARY

The present invention serves to temporarily and reliably secure a power hand tool to a ferrous surface by means of a magnetic mount.

The magnetic mount provides a means to reliably and temporarily attach a power hand tool in a non-operating position or state to a magnetic surface to free workspace and inhibit the tool from falling.

Thus, in summary, the invention may be characterized in one aspect as a magnetic mount for a power tool to secure the power tool to a ferrous surface while the power tool is not in use so as to temporarily store the power tool, wherein the magnetic mount may include:

a. a substantially u-shaped bracket including a spaced apart pair of mounting arms each having a base end and an opposite distal end, a rigid cross-member joining the pair of mounting arms at the base ends, b. a mounting head on each distal end of the pair of mounting arms, c. at least one magnet mounted on the cross-member, d. wherein the pair of mounting arms are disposed in a first direction from the cross member and the at least one magnet is disposed in a second direction substantially opposite to the first direction, from the cross member, and e. wherein the mounting heads are adapted for mounting to at least one side of the power tool.

At least one rigid mounting member may be provided which is adapted to mate with at least one of the mounting heads, so as to engage the tool. Each mounting head may be shaped to at least partially encircle a corresponding rigid mounting member. The mounting member may include a mounting bolt adapted to releasably mount into the side of the power tool. Each mounting head may include an annular ring which defines an aperture sized for snug journaling of the rigid mounting member therethrough. An opening through one side of the annular ring, such as a break in the ring, may be provided so that the mounting head may be quickly released from the mounting member.

The pair of mounting arms may be substantially parallel at their distal ends. The mounting heads may be adapted for mounting on substantially opposite sides of the power tool.

The magnet may have at least one substantially planar face. A magnet holder may be mounted onto the cross-member. The magnet may be mounted onto the magnet holder so as to maintain the planar face of the magnet in an orthogonal plane substantially orthogonal to a first plane substantially containing at least the cross-member and the pair of mounting arms. The u-shaped bracket may be sized to fit over and receive the power tool between the pair of mounting arms in a mounting fit over a body of the power tool. The mounting fit may be snug over the body of the power tool at least adjacent the mounting heads. The mounting arms may be both correspondingly arched in a parallel pair of second planes orthogonal to the orthogonal plane and the first plane so as to dispose at least one magnet adjacent to a center of mass of the power tool.

BRIEF DESCRIPTION OF THE DRAWINGS

FIG. 2a is an enlarged, partially cut away, view of FIG. 2 showing the magnetic mount temporarily mounted to the top surface of the I-beam.

DETAILED DESCRIPTION OF EMBODIMENTS OF THE INVENTION

The present invention is a magnetic mount for temporarily storing a power hand tool on a ferrous surface at a work site between active use of the tool. The magnetic mount provides a safety measure to inhibit power tools such as hand grinders from falling from work sites on structural steel construction projects. Magnetic mount equipped tools may also be stored temporarily on ferrous surfaces to free up work space for short or extended periods of time.

Figure 1:
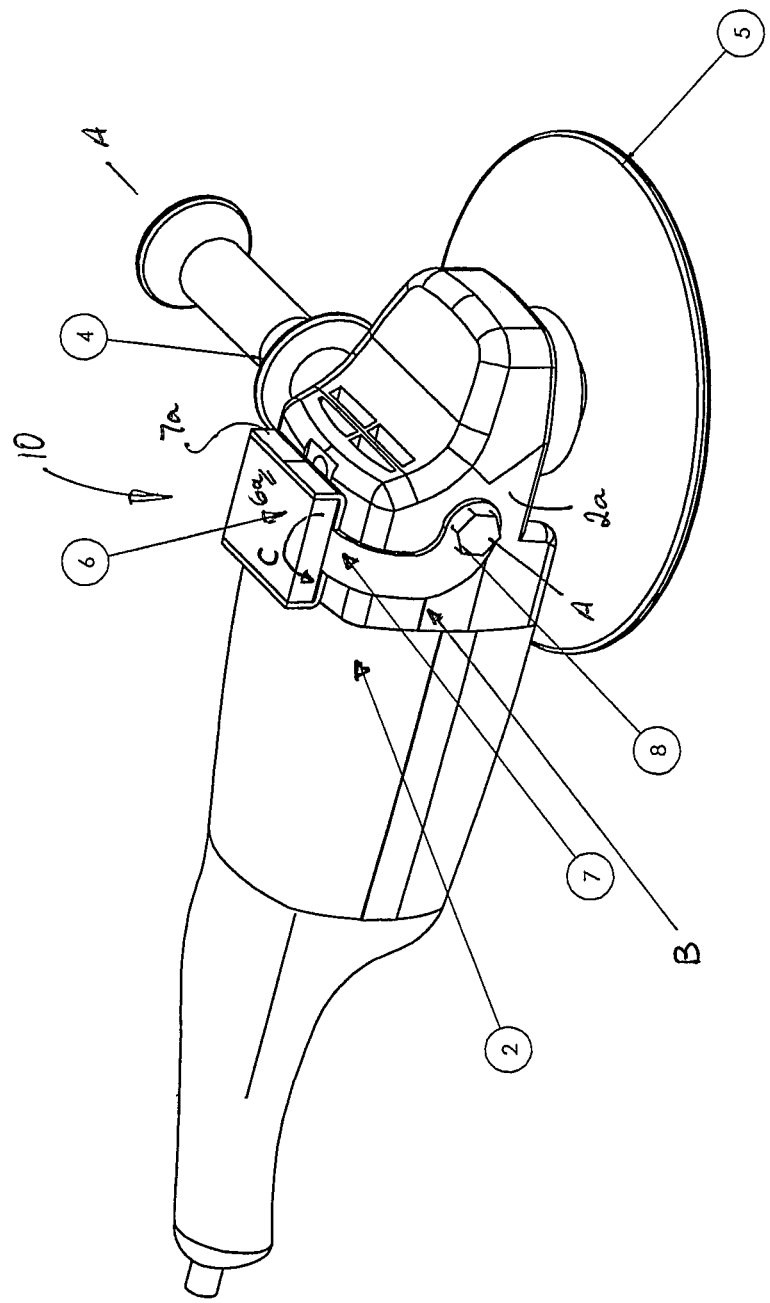
FIG. 1 is, in front perspective view, an embodiment of the magnetic mount attached to a hand grinder.
Figure 1A:
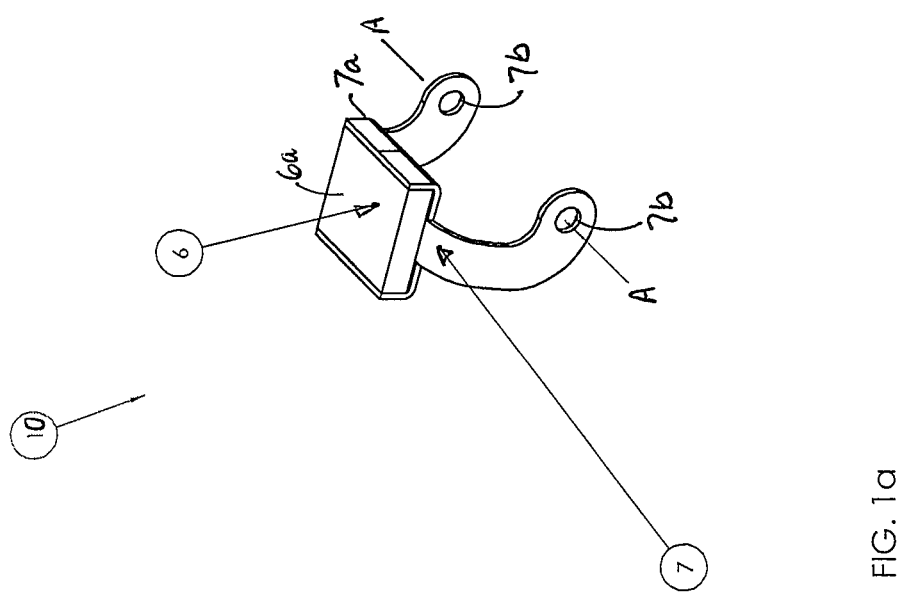
FIG. 1a is the magnetic mount of FIG. 1.

In the embodiment shown in FIG. 1, a tool is illustrated by way of example as a hand grinder 2. A magnetic mount 10, better seen in FIG. 1a, is mounted onto grinder 2 by means of a saddle or u-shaped mounting bracket 7. Bracket 7 is removably fastened to the sides 2a of the body of the grinder 2 by means of mounting bolt 8 and auxiliary handle 4, although other fasteners would also work. Bracket 7 has a magnet holder 7a, which may be a cup such as that illustrated. Magnet holder 7a is formed to retain permanent magnet 6 with the magnet's flux (not shown) oriented to most beneficially hold bracket 7 onto a magnetic or ferrous surface. Thus, again by way of example which is not intended to be limiting, the magnet 6 has a planar surface 6a which is oriented parallel to the mounting axis A along which bolt 8 and handle 4 are mounted to the sides 2a grinder 2.

Figure 2:
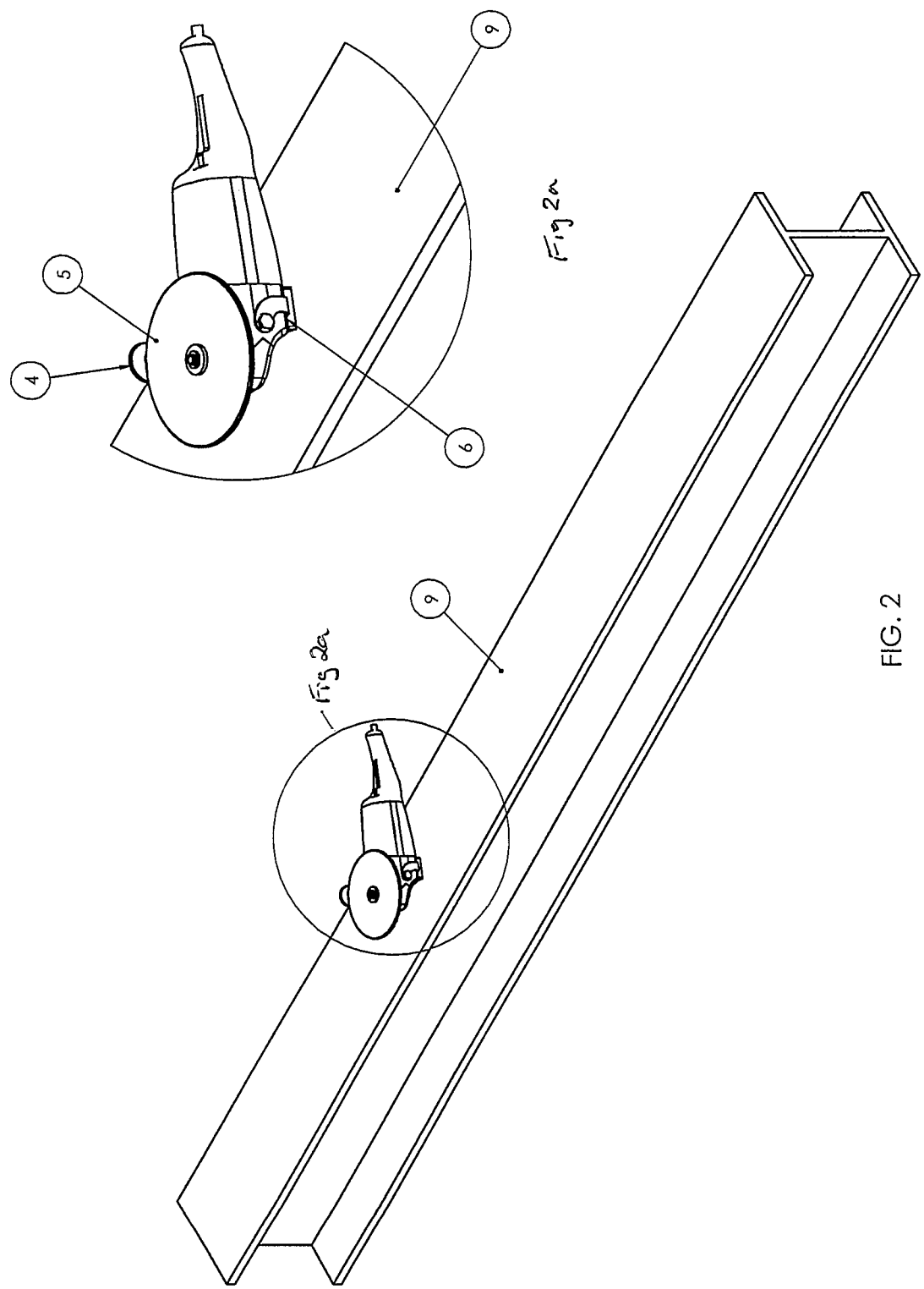
FIG. 2 is, in front perspective view, the hand grinder of FIG. 1 equipped with a magnet mount according to one embodiment so as to securely fasten the tool to a structural I-beam as would be the case in a structural steel construction project.

FIG. 2 shows the grinder 2 with the magnetic mount 10 mounted thereon, with the magnetic mount 10 magnetically secured to the top surface of I-beam 9 as may be used in a structural steel construction project. By the use of this invention tools, such as power tools, may be more safely used in for example overhead construction and maintenance projects by means of the largely unobtrusive and relatively light-weight magnetic mount 10 for securing the hand tool in between its use.

Figure 1B:
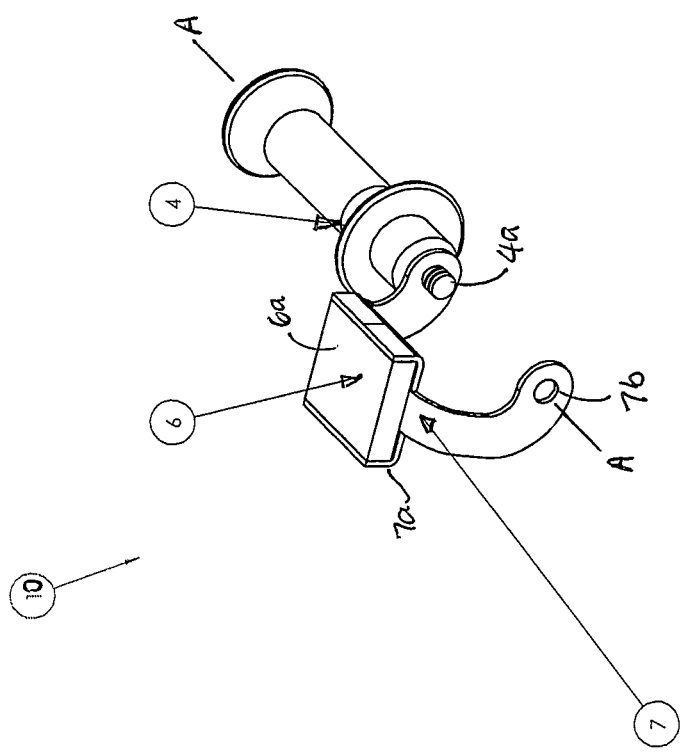
FIG. 1b is the magnetic mount and auxiliary handle of FIG. 1.
Figure 3:
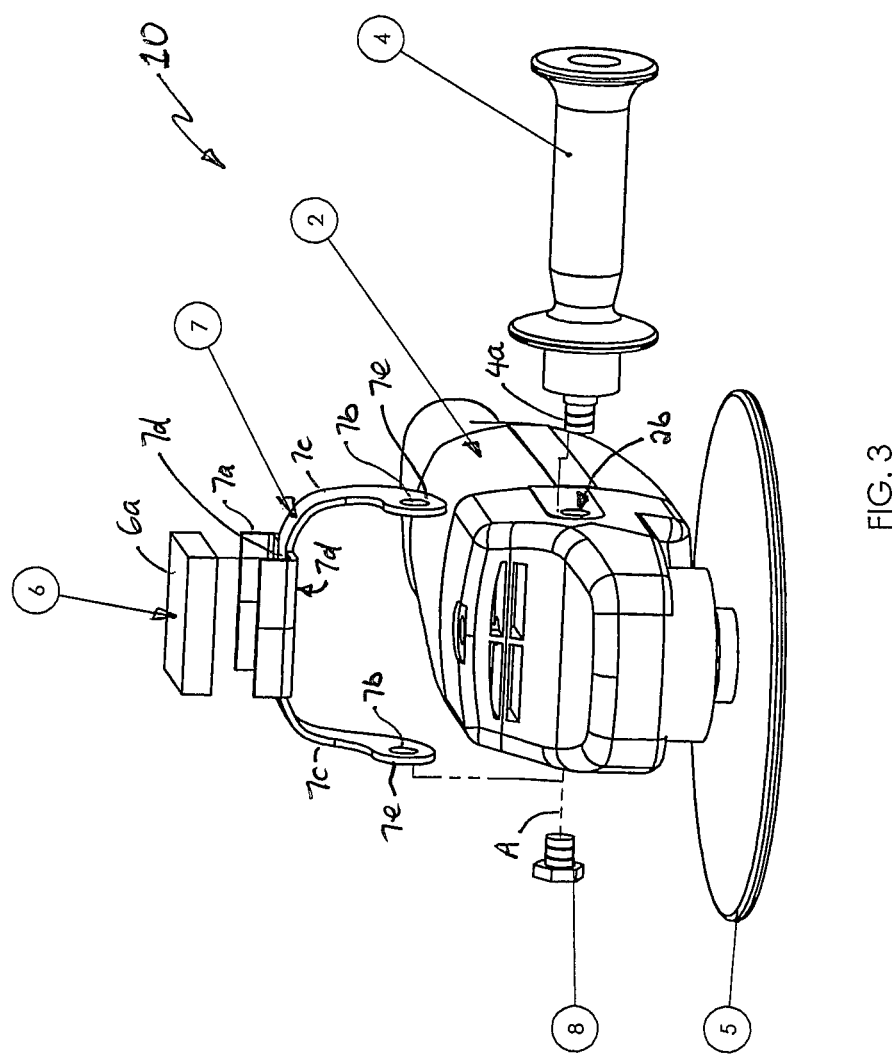
FIG. 3 is, in exploded assembly view, the hand grinder and magnetic mount of FIG. 1.

FIG. 3 shows, in an exploded view, the magnetic mount 10 and hand grinder 2. Permanent magnet 6 is housed and rigidly held in place by a magnet holder 7a on mounting bracket 7. Mounting bracket 7 is secured to the hand grinder 2 by means of bolt 8 and auxiliary handle 4 threadably mounted into threaded engagement with the side walls of the grinder 2. Bolt 8 and handle 4 are examples of mounting members which mount through apertures 7b in the mounting heads 7e of arms 7c. Handle 4 is shown mounted through one aperture 7b in FIG. 1b, and into a threaded aperture 2b in a side wall 2a of the hand grinder 2 in FIG. 3.

A pair of arms 7c depend from a cross member 7d. Magnet mount 7a is mounted on, or formed as part of, cross member 7d. In the embodiment illustrated the pair of arms 7c and cross member 7d form a u-shaped bracket wherein the distal ends of each arm 7c form mounting heads 7e, each having an aperture 7b through which fasteners such as bolts 8 and the threaded male end 4a of auxiliary handle 4 are journalled so as to threadably mate into the sides 2b of the grinder housing. In other embodiments, for example for use with other tools, whether they are power tools such as the hand grinder 2 or not, bracket 7 may have one or more arms 7c and the magnet 6 may be mounted directly onto the arm or arms, depending on how the bracket best mounts to the particular tool. The mounting bracket for the purposes of the present invention just has to serve as a supporting framework which releasably mounts to the tool so as to rigidly hold the magnet in suitable position along or adjacent the tool for the magnetic mounting of the tool to a ferrous surface.

Advantageously, but without intending to be limiting, the bracket 7 may also be used to position the magnet 6 close to, or at least somewhat close too, the center of balance or center of mass of the tool. Thus, in the example of the hand grinder 2, the convenient use of the mounting axis A along which to attach bracket 7 using bolt 8 and auxiliary handle 4 (which may exist on the tool already), would place the magnet 6 forward along the tool (i.e., toward the grinder disc or head 5) relative to the tool's center of mass or center of balance if the magnet 6 was mounted directly over axis A. Thus bracket 7, and in particular arms 7c, are curved or arched rearwardly along the body of the tool to position the magnet 6 closer to the tool's center of mass located internally of grinder 2 approximately at the location indicated by B. This reduces the moment or torque for example in direction C applied to the magnet 6 by the weight of the tool acting through its center of mass (at B) along the moment arm between the center of mass and the center of the magnet. The closer the magnet to the tool's center mass the less the moment or torque acting on the magnet's surface 6a and the less likely or prone the tool will be to twisting or peeling the magnet off from the ferrous surface to which it is magnetically adhered. The less the torque applied to the magnet, the smaller and thus lighter the magnet may be in order to resist the weight of the tool breaking the magnetic connection or mounting of the magnet to the ferrous surface.

Figure 1C:
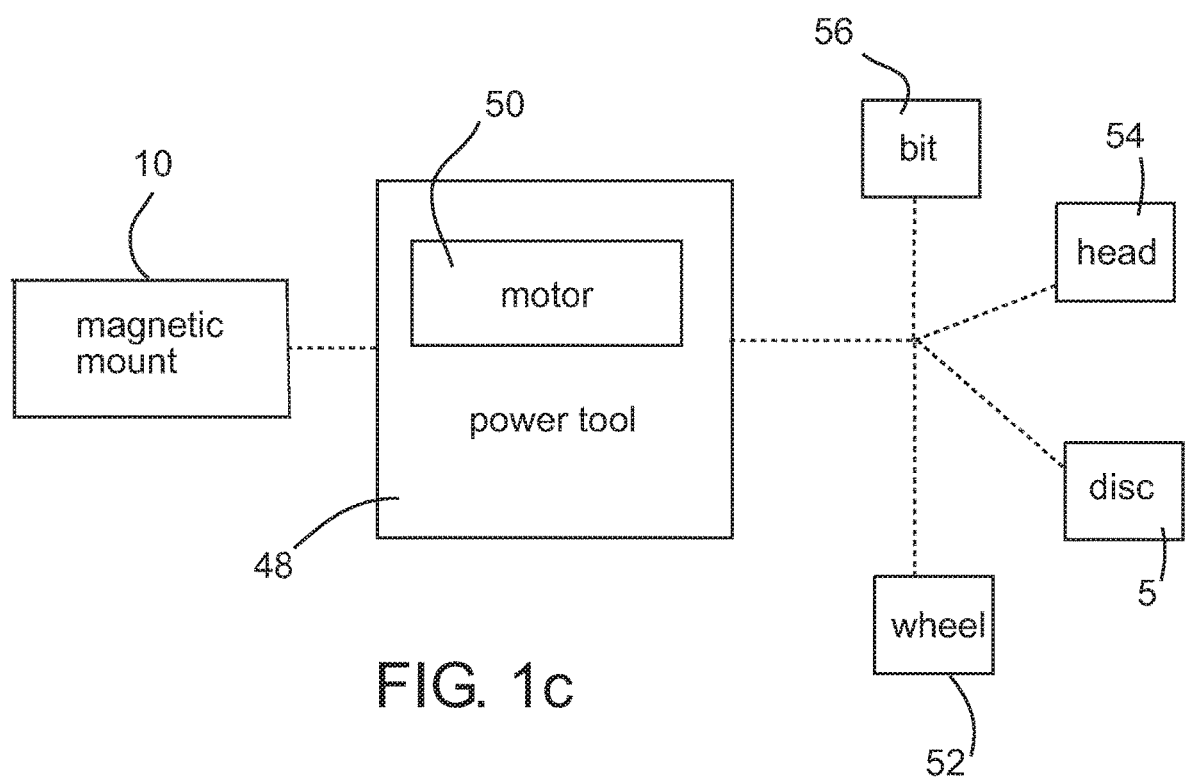
FIG. 1c shows a diagram of a combination of a magnetic mount and a power tool, the power tool having a motor and one of a head, bit, wheel, or a disc, depending on the type of power tool.

In other tools, especially power tools 48 (FIG. 1c) which may be quite heavy due to the weight of their motors 50 (FIG. 1c), frames, handles, heads 54 (FIG. 1c), bits 56 (FIG. 1c), wheels 52 (FIG. 1c), discs 5 (FIG. 1c) or other components when added collectively, there are often auxiliary handles provided of various kinds and in various orientations. To take advantage of the position of these handles in order to mount an equivalent bracket 7, that is a functionally equivalent bracket to hold the magnet 6, the shape of bracket 7 may have to be considerably modified from that illustrated. However, the function remains the same; to hold the magnet rigidly adjacent the tool in an non-obstructive position, advantageously near to the center of mass or balance of the tool.

Figure 4:
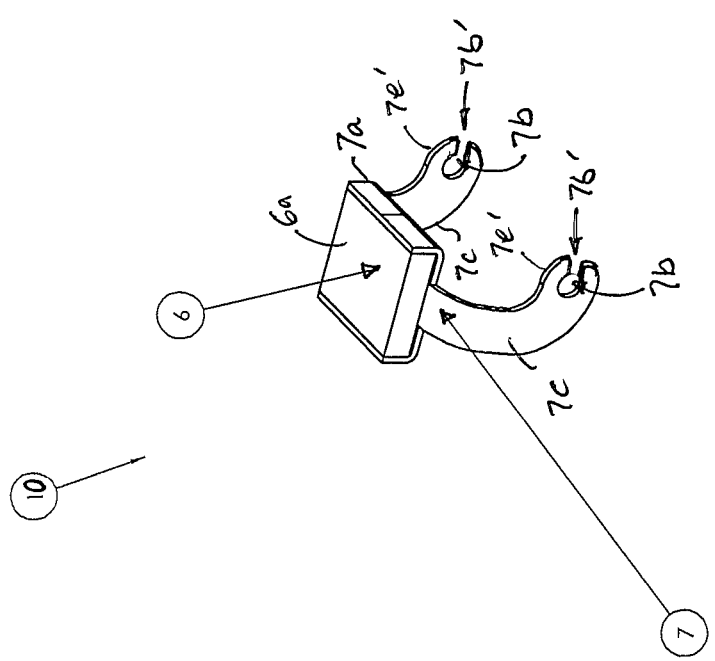
FIG. 4 is the magnetic mount of FIG. 1a showing quick release couplings formed in the mounting heads of the mounting arms.

As seen in FIG. 4, mounting head 7e' need not be formed as an annular ring so as to fully encircle fasteners such as bolt 8 or auxiliary handle threaded end 4a such as seen in FIG. 1a. Rather, mounting head 7e' may be instead formed as a fork or broken ring having an opening 7b' into corresponding aperture 7b. Mounting head 7e' thus provides for a quick release of bracket 7 from its fasteners journalled in apertures 7b. In this embodiment the fasteners such as bolt 8 and handle 4 are slightly unthreaded from mounting holes 2b so as to relieve the friction acting on mounting heads 7e'. Bracket 7 may then be rotated as necessary (for example in a direction opposite to direction C about axis A) until openings 7b' are aligned so that the fasteners may be pulled through openings 7b', for example so that bracket 7 may be pulled upwardly away from the tool, to thereby quickly release magnetic mount 10 from the tool. The openings 7b' also thus provide for quick re-mounting of bracket 7 onto the tool.

As will be apparent to those skilled in the art in the light of the foregoing disclosure, many alterations and modifications are possible in the practice of this invention without departing from the scope of the following claims to the invention.

What is claimed is:

1. A combination comprising:
   a power tool having a body with sides, the body mounting a motor and a component that is driven by the motor when the power tool is being operated by a user, the component comprising a head, a disc, a wheel, or a bit; and
   a magnetic mount, which has:
   a. a substantially u-shaped bracket including a spaced apart pair of mounting arms each having a base end and an opposite distal end, with a rigid cross-member joining said pair of mounting arms at said base ends,
b. a mounting head on each said distal end of said pair of mounting arms,
c. at least one magnet mounted on said rigid cross-member,
d. wherein said pair of mounting arms are disposed in a first direction from said rigid cross member and said at least one magnet is disposed in a second direction substantially opposite to said first direction, from said rigid cross-member, and
wherein said mounting heads are rigidly and releasably mounted to the sides of the power tool, with each mounting head defining an opening that at least partially encircles a corresponding aperture in a respective one of the sides of the power tool, in which each mounting head is mounted to the respective one of the sides by a respective fastener or a respective handle;
wherein the substantially u-shaped bracket extends along the body of the power tool from a respective one of the sides, around the power tool, and to the other respective one of the sides of the power tool; and
wherein the magnetic mount is structured to:
permit the power tool to be secured to a ferrous surface to free up a work space while the power tool is not in use so as to temporarily store the power tool; and
remain mounted on the power tool, with the at least one magnet disconnected from the ferrous surface, while the power tool is operated, by the user to drive the component via the motor.

2. The combination of claim 1 wherein each said mounting head is shaped to encircle the respective fastener or respective handle.

3. The combination of claim 2 wherein at least one of the mounting heads is mounted to the respective one of the sides by the respective fastener, and the respective fastener includes a mounting bolt adapted to releasably mount into the respective side of the power tool.

4. The combination of claim 1 wherein said pair of mounting arms are substantially parallel at said distal ends of said pair of mounting arms, and the sides of the power tool to which each mounting head is mounted are substantially opposite sides of the power tool.

5. The combination of claim 1 wherein said at least one magnet has at least one substantially planar face, and wherein the rigid cross-member includes a magnet holder, and wherein said at least one magnet is mounted onto said magnet holder so as to maintain said planar face of said at least one magnet in an orthogonal plane substantially orthogonal to a first plane substantially containing at least said rigid cross-member and said pair of mounting arms.

6. The combination of claim 1 wherein said substantially u-shaped bracket is sized to fit over and receive the power tool between said pair of mounting arms in a mounting fit over the body of the power tool.

7. The combination of claim 5 wherein said mounting arms are both correspondingly arched in a parallel pair of second planes orthogonal to said orthogonal plane and said first plane so as to dispose said at least one magnet adjacent a center of mass of the power tool.

8. The combination of claim 1 in which the power tool is a grinder, and the component is a grinding disc.

9. The combination of claim 8 in which at least one of the mounting heads is mounted to the respective side of the power tool by the respective handle.

* * * * *